United States Patent [19]

Dickinson et al.

[11] 4,427,337

[45] Jan. 24, 1984

[54] BEARING FOR LIQUID METAL PUMP

[75] Inventors: Robert J. Dickinson, Shaler Township, Allegheny County; John Wasko, Plum Borough; William E. Pennell, Unity Township, Allegheny County, all of Pa.

[73] Assignee: The United States of America as represented by the United States Department of Energy, Washington, D.C.

[21] Appl. No.: 235,209

[22] Filed: Feb. 17, 1981

[51] Int. Cl.³ ............................................ F01D 11/00
[52] U.S. Cl. .................................. 415/113; 415/135; 415/174; 415/176
[58] Field of Search ............... 415/134, 135, 142, 174, 415/113, 111, 176

[56] References Cited

U.S. PATENT DOCUMENTS

| | | | |
|---|---|---|---|
| 819,986 | 5/1906 | Ellis | 415/142 |
| 1,844,619 | 2/1932 | Wintroath | 415/113 |
| 2,936,999 | 12/1956 | Coar | 415/134 |
| 2,941,781 | 6/1960 | Boyum | 415/142 |
| 3,476,488 | 11/1969 | Chambert . | |
| 3,652,178 | 3/1972 | Guillot | 415/134 |
| 3,715,270 | 2/1973 | Jackson . | |
| 3,910,714 | 10/1975 | Allen et al. . | |
| 3,947,154 | 3/1976 | Klepp et al. . | |
| 4,050,986 | 9/1977 | Ference . | |

Primary Examiner—Harvey C. Hornsby
Assistant Examiner—Brian J. Bowman
Attorney, Agent, or Firm—L. A. DePaul

[57] ABSTRACT

A liquid metal pump bearing support comprises a series of tangentially oriented spokes that connect the bearing cylinder to the pump internals structure. The spokes may be arranged in a plurality of planes extending from the bearing cylinder to the pump internals with the spokes in one plane being arranged alternately with those in the next plane. The bearing support structure provides the pump with sufficient lateral support for the bearing structure together with the capability of accommodating differential thermal expansion without adversely affecting pump performance.

3 Claims, 4 Drawing Figures

BEARING FOR LIQUID METAL PUMP

GOVERNMENT CONTRACT

The invention described herein was made in the course of, or under, Contract No. W-31-109-38-5001 with the United States Department of Energy.

BACKGROUND OF THE INVENTION

This invention relates to bearings and more particularly to bearings for liquid metal pumps.

In liquid metal fast breeder nuclear reactors, a pump circulates a liquid metal in heat transfer relationship with a core disposed in the reactor vessel for transferring heat from the core to equipment for generating steam. The steam may then be used to produce electricity in a commonly understood fashion.

Generally, the liquid metal pumps employed in liquid metal fast breeder reactors, employ radial bearings that are immersed in and lubricated by the liquid metal that is being pumped. Since the temperature of the liquid metal can exceed 1000° F., material stability problems as well as thermal transient problems can produce differential size changes between the liquid metal pump bearing unit and the mounting structure for the bearing unit. The differential size changes can interfere with proper functioning of the bearings and thus render the pump inoperable.

Thermal transient events which cause rapid changes in the temperature of the liquid metal on the order of 200° F. to 300° F. within a few minutes are part of the design duty cycle for these liquid metal pumps. Due to the much lower thermal inertia of the bearing unit relative to that of the pump internals structure that supports the bearing, these thermal transient events can cause large temperature differences to be generated between the bearing unit and the support structure. Detailed thermal stress analysis of these transient conditions indictes that conventional bearing mounting designs which may be employed in lower temperature applications exhibit unacceptable stress levels when employed for the liquid metal pump application.

In addition, experience with liquid sodium pumps has shown that the dimensional stability of the materials of construction for liquid metal pumps can be significantly affected by long-term exposure to temperatures on the order of 1000° F. It has been determined that metallurgical changes in the bearing structure can occur due to operation of the pump at temperatures near 1000° F. These metallurgical changes can cause a decrease in the mounting diameter of the bearing support structure that exerts excessive force on the bearing unit and, in turn, can cause sufficient decrease in the bearing clearance to cause seizure of the bearing and failure of the pump. An elaborate and expensive material heat treatment process can be employed to minimize dimensional stability problems. However, it would be desirable to be able to avoid such expensive procedures.

Therefore, what is needed is a liquid metal pump having a bearing support structure that has sufficient lateral stiffness to support the pump shaft under operating conditions and having the capability of accommodating differential thermal expansion.

SUMMARY OF THE INVENTION

A liquid metal pump bearing support comprises a series of tangentially oriented spokes that connect the bearing cylinder to the pump internals structure. The spokes may be arranged in a plurality of planes extending from the bearing cylinder to the pump internals with the spokes in one plane being arranged alternately with those in the next plane. The bearing support structure provides the pump with sufficient lateral support for the bearing structure together with the capability of accommodating differential thermal expansion without adversely affecting pump performance.

BRIEF DESCRIPTION OF THE DRAWINGS

While the specification concludes with claims particularly pointing and distinctly claiming the subject matter of the invention, it is believed the invention will be better understood from the following description taken in conjunction with the accompanying drawings, wherein:

DESCRIPTION OF THE PREFERRED EMBODIMENT

Pumps for liquid metal fast breeder reactors generally operate at relatively high temperatures and are, therefore, subject to severe thermal transients which can produce large temperature differences between the bearing unit and the pump structure supporting the bearing unit. The invention described herein provides a thermally compensated bearing support structure with the lateral support stiffness necessary to satisfy pump dynamic consideration while simultaneously providing the capability to tolerate differential thermal expansion between the bearing unit and the pump structure.

Figure 1:
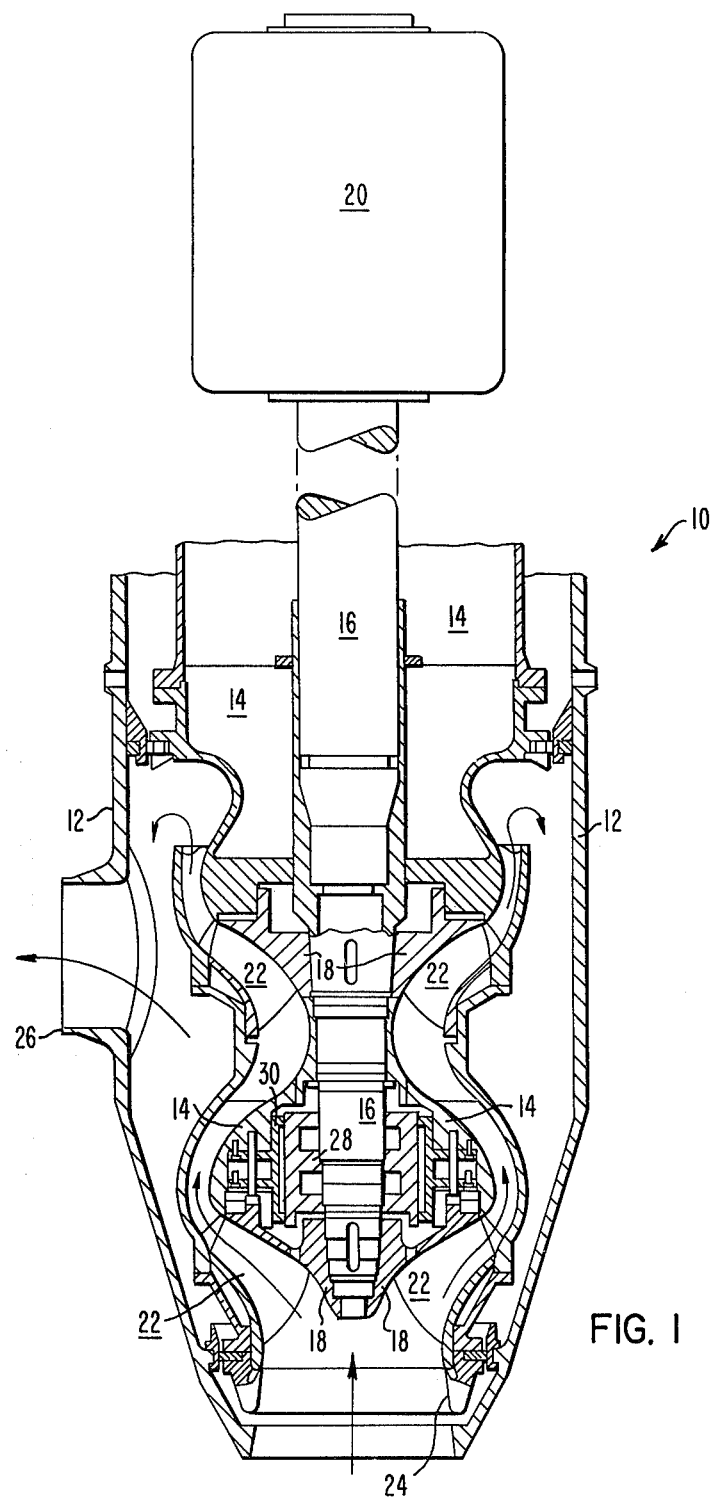
FIG. 1 is a cross-sectional view in elevation of a liquid metal pump.

Referring to FIG. 1, the liquid metal pump is generally referred to as 10 and comprises a pump casing 12 with pump internals 14 mounted therein. A rotatable pump shaft 16 is disposed in pump internals 14 and has a plurality of impellers 18 attached thereto. An electric motor 20 is attached to one end of pump shaft 16 for rotating pump shaft 16 in a conventional manner. The rotation of pump shaft 16 by motor 20 causes impellers 18 with vanes 22 attached thereto, to rotate thereby drawing a liquid metal such as sodium through pump inlet 24. The liquid metal drawn through pump inlet 24 is then pumped through pump internals 14 and out through pump outlet 26 all in a manner well understood in the art.

Figure 2:
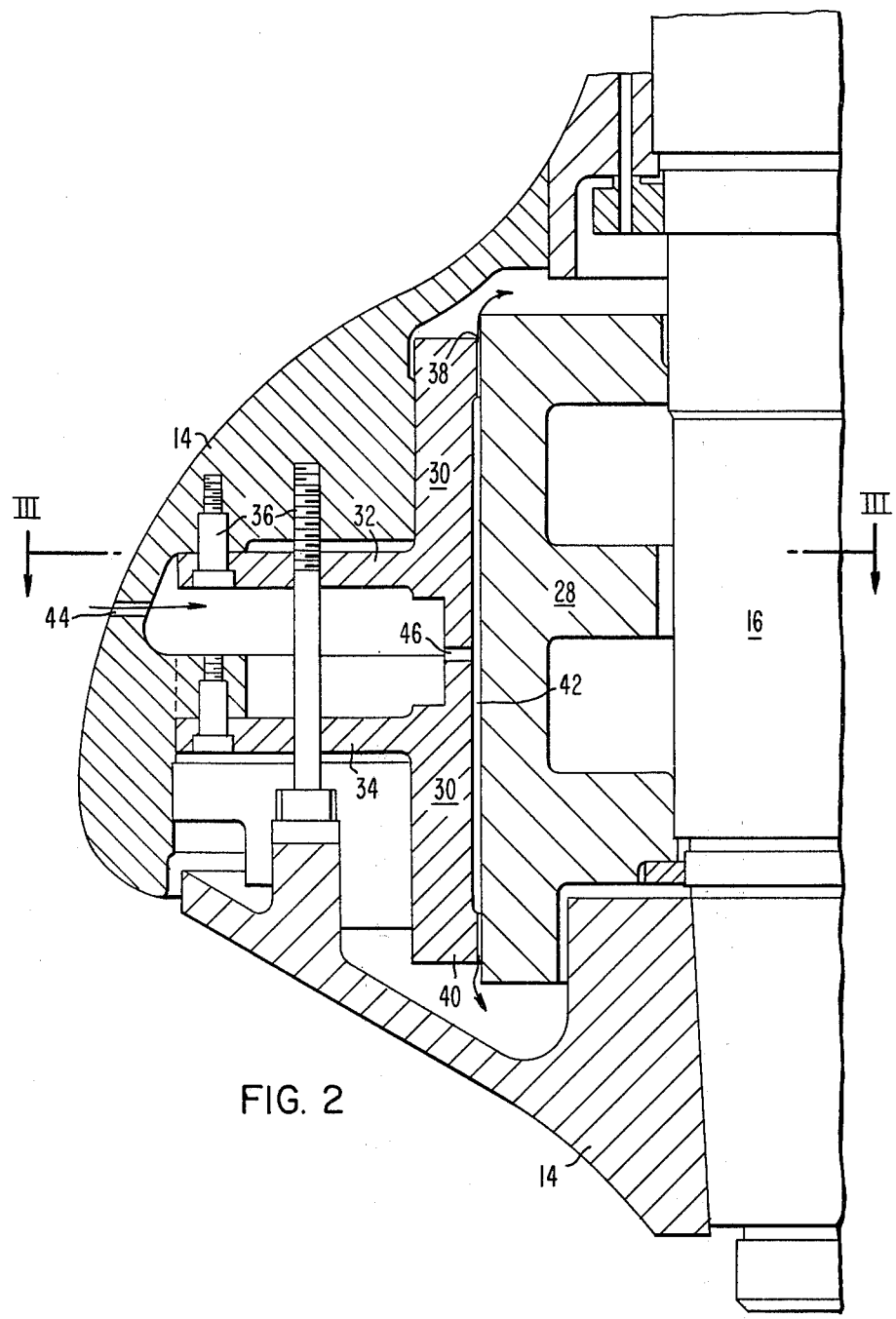
FIG. 2 is a cross-sectional view in elevation of the bearing support structure.

Referring now to FIGS. 1 and 2, an inner bearing cylinder 28, which may be a substantially cylindrical member, is disposed around and attached to pump shaft 16 so as to rotate with pump shaft 16. An outer bearing cylinder 30, which also may be a substantially cylindrical member, is disposed around inner bearing cylinder 28 but not attached thereto. Outer bearing cylinder 30 has a plurality of first spokes 32 attached to outer bearing cylinder 30 and defining a first plane of spokes. Another set of second spokes 34 are attached to outer bearing cylinder 30 and define a second plane of spokes. First spokes 32 and second spokes 34 may be attached to pump internals 14 by means of bolts 36 so as to provide a means of attaching outer bearing cylinder 30 to pump internals 14. Outer bearing cylinder 30 is constructed to form at least a first land 38 at one end thereof and a second land 40 at the other end thereof for establishing the bearing surfaces between outer bearing cylinder 30 and inner bearing cylinder 28. First lands 38 and second lands 40 may be continuous cylindrical formations extending around the entire circumference of outer bearing cylinder 30 or they may be segmented thereby defining several independent bearing surfaces between outer bearing cylinder 30 and inner bearing cylinder 28. At least one bearing pocket 42 is defined between outer bearing cylinder 30 and inner bearing cylinder 28 and between first lands 38 and second lands 40. Bearing pocket 42 may extend the entire circumference of outer bearing cylinder 30 or may be segmented thereby defining several similar bearing pockets between outer bearing cylinder 30 and inner bearing cylinder 28. A first hole 44 may be provided in pump internals 14 between first spokes 32 and second spokes 34 and a second hole 46 may be provided in outer bearing cylinder 30 between first spokes 32 and second spokes 34 for allowing the high pressure liquid metal to flow therethrough and into bearing pocket 42 when pump shaft 16 is rotating. As pump shaft 16 and inner bearing cylinder 28 rotate, the liquid metal in bearing pocket 42 is forced out between the bearing surfaces defined between first lands 38 and inner bearing cylinder 28 and between second lands 40 and inner bearing cylinder 28. The action of the liquid metal being forced between these bearing sufaces prevents metal-to-metal contact therebetween thus creating the bearing lubrication. The bearing surfaces may be provided with Stellite 6 hard facing that may be weld deposited on separate replaceable Type 304 stainless steel inserts to provide greater bearing life and increased serviceability.

Figure 3:
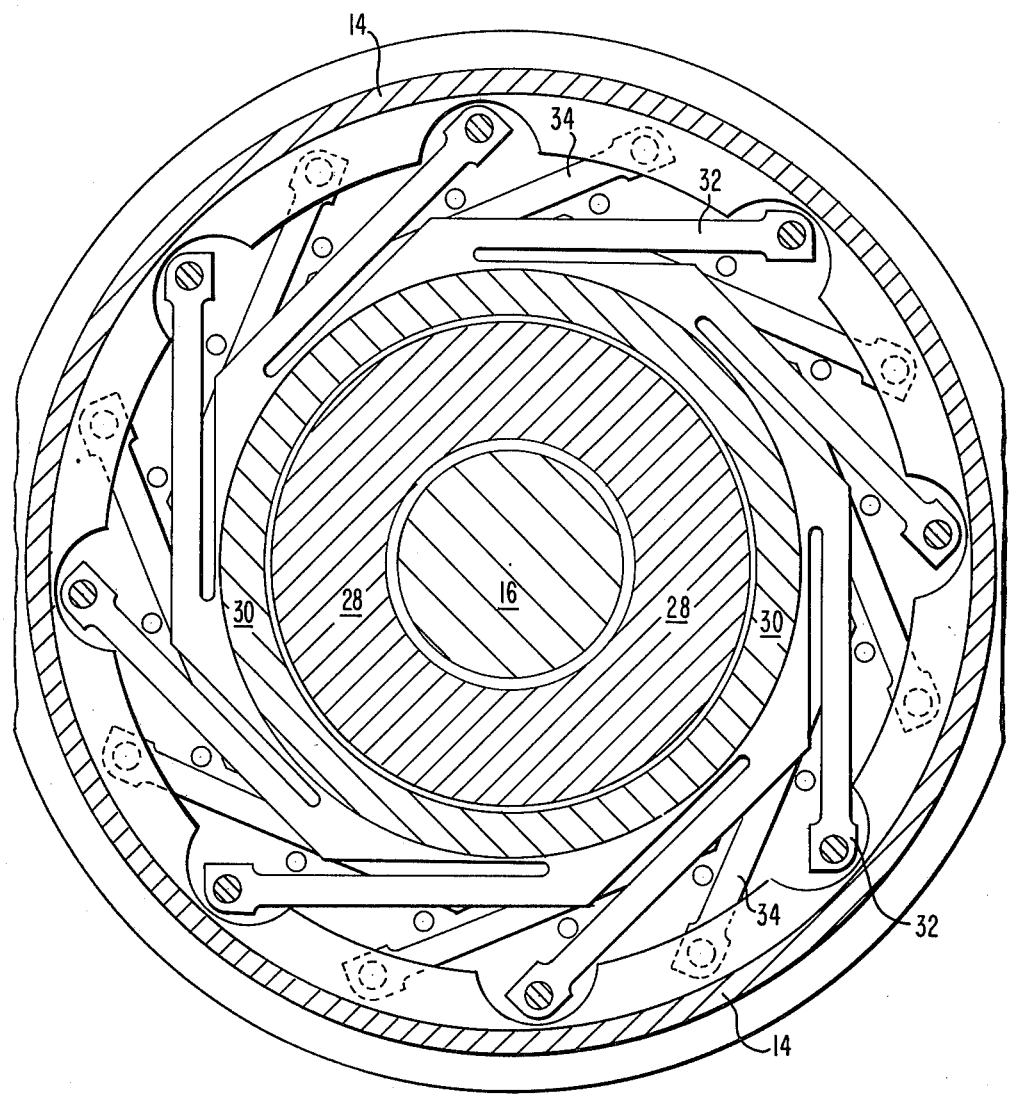
FIG. 3 is a view along line III—III of FIG. 2.
Figure 4:
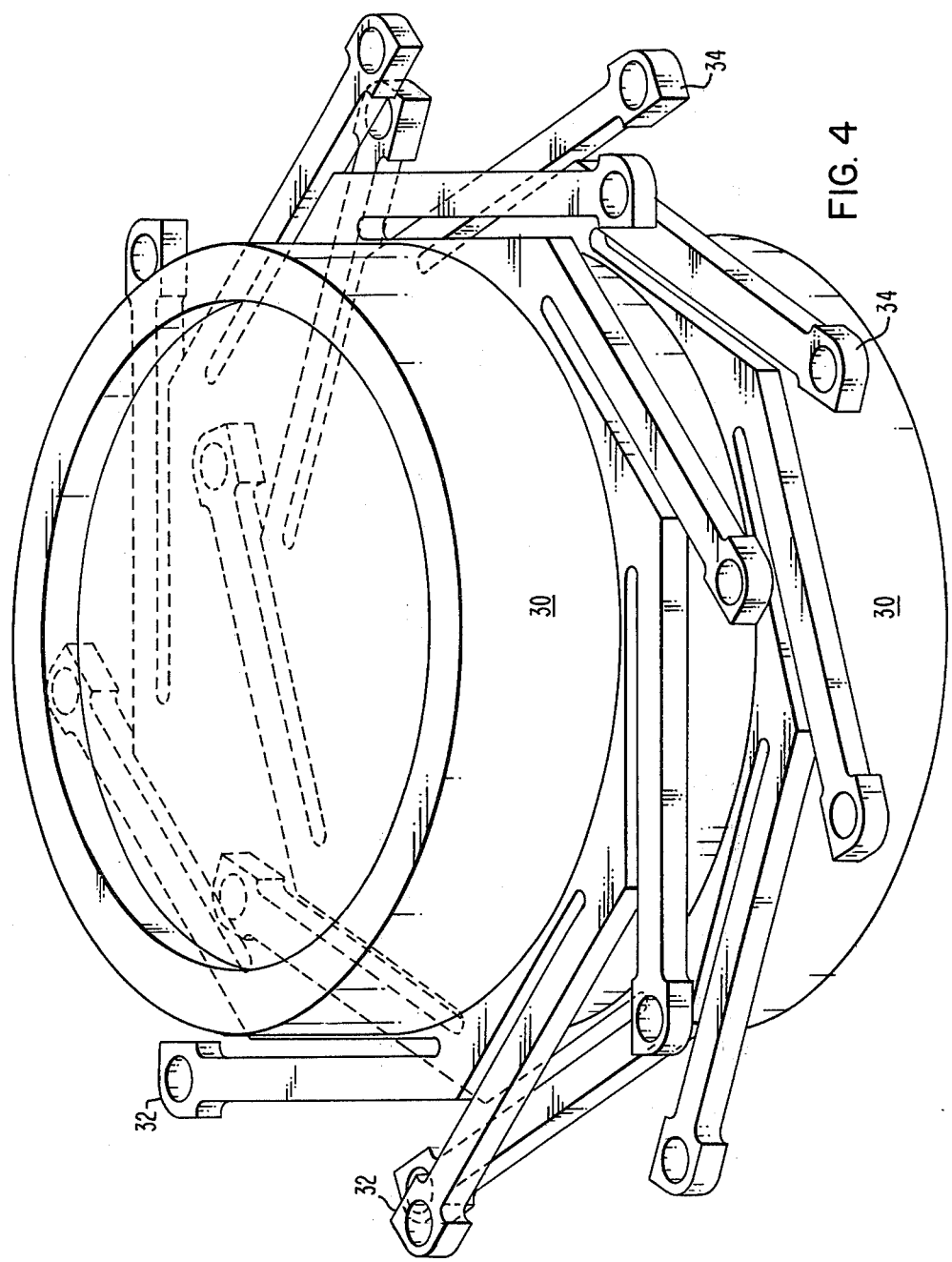
FIG. 4 is a view in perspective of the bearing support structure.

Referring now to FIGS. 3 and 4, each first spoke 32 and each second spoke 34 may be a substantially rectangularly shaped bar permanently attached at one end to the outside of outer bearing cylinder 30 and having the capability of being bolted at the other end to another structure such as pump internals 14. Each spoke is tangentially attached to outer bearing cylinder 30 and may be arranged in either a clockwise or counterclockwise arrangement. As can be seen in FIGS. 3 and 4, first spokes 32 may be alternately arranged with respect to second spokes 34 so that the attachments of spokes to outer bearing cylinder 30 are uniformly and closely spaced similar to the attachment of the spokes to pump internals 14. The arrangement of spokes may also be such that the attachment of one spoke to outer bearing cylinder 30 is substantially in the same vertical plane as the attachment of another spoke to pump internals 14. It can be recognized that the arrangement of the spokes provides for improved circulation of the liquid sodium around the bearing support thus lessening the thermal gradients across the bearing support. The bearing support arrangement also provides a means by which outer bearing cylinder 30 can expand and contract under thermal changes by the flexing of the spokes while maintaining support for the bearing. Thus, when outer bearing cylinder 30 expands relative to pump internals 14, the expansion can be accommodating by the slight horizontal bending of the spokes while maintaining support for the bearing. In addition, the tangential configuration of the spokes permits the differential expansion of the spokes relative to pump internals 14 and to outer bearing cylinder 30 to be accommodated without producing high spoke stresses such that the spoke stresses can be relieved by means of free rotation of outer bearing cylinder 30. The combined axial stiffness of the spokes provides the required bearing lateral mounting stiffness while the bending stiffness of the spokes is sufficiently low to accommodate the differential movement between the bearing and the pump internals due to thermal transients and casting dimensional stability.

Therefore, the invention provides a liquid metal pump having a bearing support structure that has sufficient lateral stiffness to support the pump shaft under operating conditions and having the capability of accommodating differential thermal expansion.

We claim as our invention:

1. A liquid metal pump comprising:
   a rotatable pump shaft;
   an inner bearing cylinder disposed around and attached to said pump shaft;
   an outer bearing cylinder disposed around said inner bearing cylinder for supporting and allowing rotation of said inner bearing cylinder and said pump shaft, with said outer bearing cylinder having a first land and a second land mounted thereon and adjacent to said inner bearing cylinder defining a bearing pocket therebetween and with said outer bearing cylinder having a hole therein for allowing liquid metal to flow into said bearing pocket and between said first land and said inner bearing cylinder and between said second land and said inner bearing cylinder for preventing contact of said inner bearing cylinder and said lands when said pump is operating;
   a plurality of first spokes tangentially attached at one end to said outer bearing cylinder and fixedly attached at the other end to said pump and arranged in substantially one plane for supporting said outer bearing cylinder within said pump while allowing differential thermal expansion of said outer bearing cylinder with respect to said pump by horizontal bending of said first spokes; and
   a plurality of second spokes tangentially attached at one end to said outer bearing cylinder and rigidly attached at the other end to said pump and arranged in a plane different from that defined by said first spokes.

2. The liquid metal pump according to claim 1 wherein the attachment of at least one of said first spokes to said outer bearing cylinder is in substantially the same vertical plane as the attachment of at least one of said second spokes to said pump.

3. The liquid metal pump according to claim 2 wherein said first and second spokes are substantially rectangularly shaped members.

* * * * *